United States Patent [19]

Thörn et al.

[11] 4,396,346

[45] Aug. 2, 1983

[54] CENTRIFUGAL GOVERNOR

[75] Inventors: Olov Thörn, Torshälla; Staffan Jonsson, Mellösa, both of Sweden

[73] Assignee: Pax Electro Products AB, Torshälla, Sweden

[21] Appl. No.: 263,014

[22] Filed: May 12, 1981

[30] Foreign Application Priority Data

Jul. 9, 1980 [SE] Sweden .................................. 8005033

[51] Int. Cl.³ .............................................. F01D 17/00
[52] U.S. Cl. ........................................ 415/30; 415/25; 415/36
[58] Field of Search ......................... 415/18, 25, 30, 35, 415/36; 137/53; 73/534; 98/116

[56] References Cited

U.S. PATENT DOCUMENTS 3,942,422 3/1976 Kawai et al. ...................... 137/53 X
3,960,464 6/1976 Downing .......................... 98/116 X Primary Examiner—Philip R. Coe
Assistant Examiner—Frankie L. Stinson
Attorney, Agent, or Firm—Browdy & Neimark

[57] ABSTRACT

A centrifugal governor comprises a bar member pivotally mounted on a rotatable bearing member. The bar member is provided with an inclined ramp against which a follower bears which is connected to a device which is to be regulated. First and second resilient forces, which may be overcome by the centrifugal force generated by rotation of the bar member, urge the bar member into its rest position and the follower member into contact with the bar member. The governor is generally applicable, one of the preferred fields of application being the control of the flow through a channel associated with a ventilator.

10 Claims, 4 Drawing Figures

CENTRIFUGAL GOVERNOR

This invention relates to a centrifugal governor which produces a rectilinear motion in dependence on the rotational velocity of a shaft and which comprises on the one hand a centrifugal body drivable by said shaft and having a predetermined inertial mass, and on the other hand at least one resilient member which affects the centrifugal body in opposite direction to the centrifugal force and which may be overcome by the centrifugal force.

It is an object of the present invention to provide a centrifugal governor of the type aforesaid which is compact and simple in construction and has a minimum of members susceptible to failure. In a preferred embodiment the governor according to the invention allows friction-free operation.

The centrifugal governor according to the present invention is characterized by the features evident from the enclosed patent claims.

Figure 1:
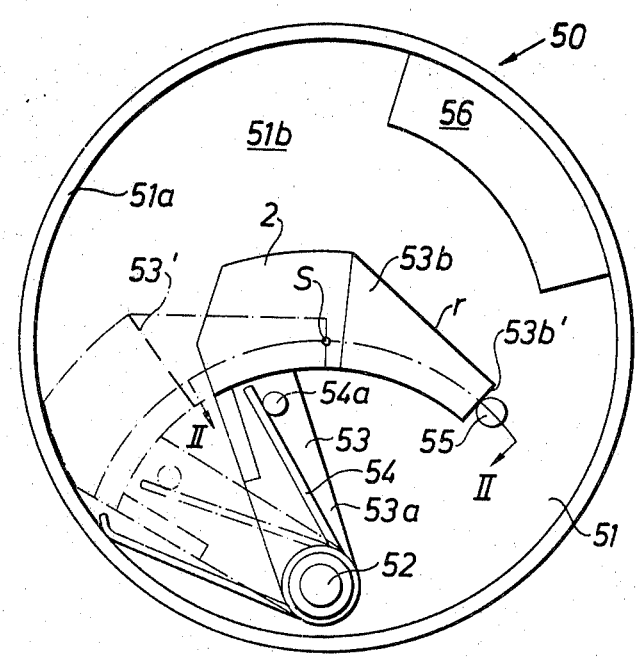
Figure 2:
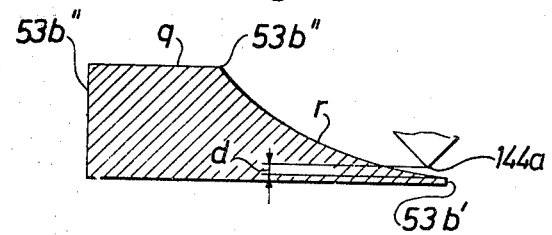
Figure 3:
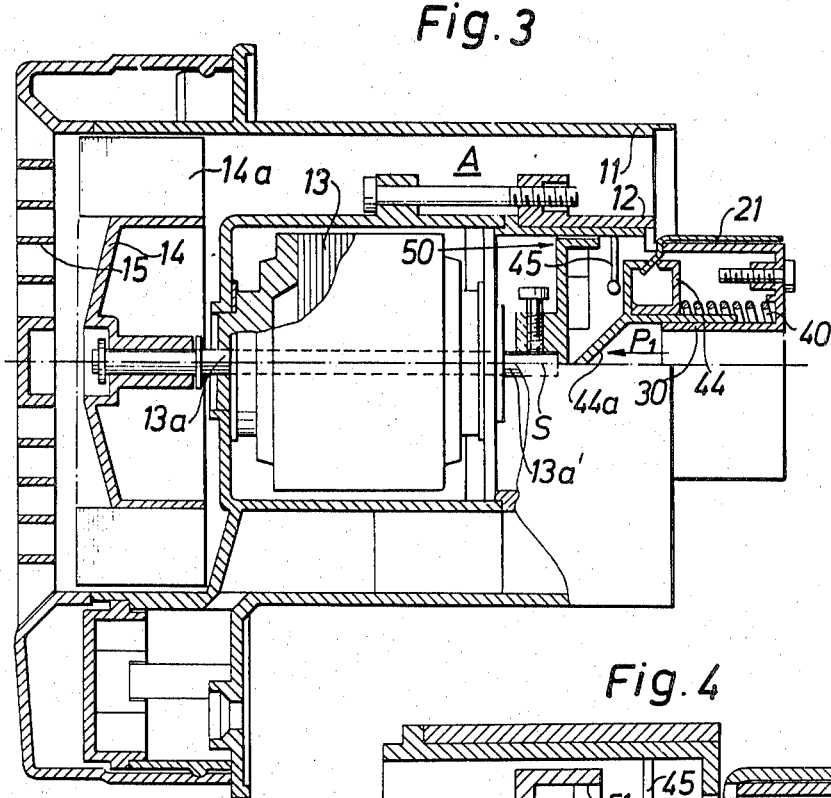
Figure 4:
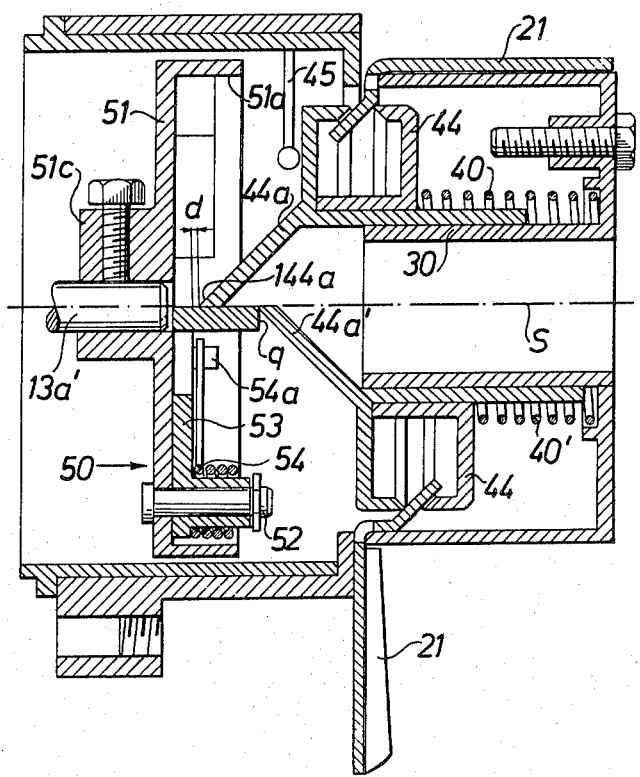

The invention will be more easily understood after consideration of the examplary embodiment which will now be described with reference to the attached drawings, in which:

FIG. 1 is a front elevation of an embodiment of the governor according to the invention, FIG. 2 is a developed sectional view along the line II—II in FIG. 1 of the governor of FIG. 1, FIG. 3 is an axial sectional view of a ventilator provided with the governor of FIG. 1, and FIG. 4 is an axial sectional view at a larger scale of the rear part of the ventilator of FIG. 3, showing in the upper half the rest position and in the lower half the active position thereof.

According to FIGS. 1 and 2, a centrifugal governor 50 according to the present invention comprises a pot-shaped bearing member 51 with a planar, circular bottom plate 51b, an upright side wall 51a and a central hub 51c (FIG. 4) for mounting on a rotatable shaft 13a'. At an eccentrically situated location on the bottom plate 51b is a pivot pin 52 which a bar member 53 is pivotally mounted. A first resilient means, defined by a hair pin spring 54, which with one arm engages the side wall 51a and with a second arm engages a protruding bolt 54a on the bar member 53, presses the latter constantly to the right in FIG. 1 until the bar member 53 is stopped by a stop 55.

Bar member 53 has in the example shown two arms, a first arm 53a mounted on the pivot pin 52, and a second arm 53b attached to the first one and extending athward thereto.

The second arm 53b has a profile which is evident from FIG. 2. Between a first outer edge 53b' and an inner edge 53b" the thickness of the arm 53b increases continually, so that an inclined ramp r is provided, whereas between said inner edge and a second outer edge 53b''' the thickness does not change, preserving its maximum value, so that a non-inclined ramp q is obtained. The bar member 53 defines a centrifugal body, the material beneath the non-inclined ramp q forming a conveniently dimensioned inertial mass. A counter-balance mass 56 is provided on the bearing member 51 to equilibrate dynamic forces in operation. It will be appreciated that the bar member, instead of having two arms, one gateward of the other, also may have some other shape, such as that of a circular segment with a center at 52.

The governor operates as follows:

At rest, first spring means 54 presses bar member 53 into the position which in FIG. 1 is shown in solid lines and which is defined by stop bolt 55. A follower means such as a nose tip 144a (FIG. 2), connected to a device which shall be controlled in dependence on the rotation of shaft 13a' is by second resilient means, such as helical spring 40 (FIGS. 3, 4) constantly pressed in the direction towards the bar member 53. First resilient means 54 is dimensioned to be able to overcome the second resilient means and to compress the helical spring as is shown at 40' in the lower half of FIG. 4.

When shaft 13a' begins to rotate, the centrifugal force urges bar member 53 against side wall 51a (which acts as a stop means) because stop bolt 55 defines such a rest position for bar member 53, in which the major portion of its inertial mass, in particular a large portion of the mass under the noninclined ramp q, is situated on the opposite side of the axis of rotation S of the bearing member 51 than where the stop bolt 55 itself is located.

The follower nose 144a, pressed by the helical spring 40, glides down along the inclined ramp r until this movement is stopped by a stop means 45, as shown in the upper half of FIG. 4. Bar member 53 of the governor 50 is then situated in the position shown in FIG. 1 by dot and dash lines, because the force of hair pin spring 54 has been overcome by the centrifugal force. Shortly before the lower end of ramp r reaches a position in front of the nose tip 144a, the follower means 44a (FIGS. 3, 4) is, however, stopped by said stop means 45 so that a little gap d is provided between the nose tip 144a and the lowermost portion of ramp r when the bar member 53 completes its excursion towards the side wall 51c acting as a stop means.

When shaft 13a' is stopped, the device regains its rest position thanks to the effect of the first spring means 54. The effect of hair pin spring 54 is stronger than the effect of helical spring 40, but weaker than the combined effect of said helical spring and the centrifugal force generated in bar member 53.

It will be readily recognised that stop means 45 is not absolutely mandatory and that bearing member 51 also may be defined by other embodiments than a pot-shaped cup, e.g. by a crank, as it only is essential that the pivvot point of bar member 53 is located excentrically in relation to the shaft 13a' and the axis of rotation S.

It will be appreciated that the rectilinear movement, imposed by the governor to the follower means 144a, can be used for controlling any conceivable device where some parameter shall depend on a rotational velocity which is inherent or communicated to the shaft 13a'.

In FIGS. 3 and 4 is as an example shown the use of the present governor in a ventilator according to the applicant's co-pending earlier patent application Ser. No. 253,531 (filed on Apr. 13, 1981 and corresponding to Ser. No. 8002743-). In brief, such a ventilator comprises two concentric casings 11, 12, defining an air passage or channel A, a front screen 15, an impeller 14, an electric motor 13 mounted in the inner casing 12, and an assembly of shutter blades 21 (for more detailed description, reference is made to the cited patent application). According to FIGS. 3 and 4 the ventilator is further provided with a centrifugal governor 50 according to the present invention for automatically controlling said shutter blade assembly. The electric motor 13 has an outgoing shaft 13a, on the front end of which said impeller 14 is mounted, and the protruding rear end of which defines said shaft 13a'. The shutter blade assembly is in the present case the device which shall be controlled in dependence on the rotational velocity of shaft 13a or, more precisely, in dependence on the fact if this shaft rotates or if it is at a standstill. In the former case, the shutter blades 21 shall occupy a downfolded position shown in the upper half of FIG. 4, freeing for through-flow said channel or passage A (FIG. 3) between the two casings 11, 12, while in the latter case the shutter blades 21 shall occupy an upright position as shown in the lower half of FIG. 4 and close said channel A to prevent a possible temperature fall in the ventilated space.

The shutter blades 21 are pivotally mounted on the inner casing 12 and engage, with the aid of extensions disposed inside said casing 12, a driver means 44 which is glidably mounted on a guide tube 30 and which by said helical spring 40 is constantly urged in the direction of arrow P₁ (FIG. 3). The left hand end of driver means 44, adjacent the motor 13, is shaped as a nose 44a having a tip 144a and defining said follower means co-operating with the centifugal governor 50.

In FIG. 4 is in the lower half demonstrated the situation when motor 13 is at a standstill, and the whole arrangement is in its rest or initial position, where the nose tip 144a reposes on the ramp q and the helical spring 40 is compressed into shape 40'. As soon as motor 13 begins to rotate, the bar member 53 of the governor is thrust aside by centrifugal force and nose tip 144a glides down ramp r, urged by the expanding helical spring 40 in the sense of arrow P₁. Shortly before the lowermost part of ramp r reaches the position in front of tip 144a, the driver means 44 is stopped by a stop 45, but bar member 53 continues a little bit further in its sidewise movement till it also is stopped by its stop bolt 55, but then physical contact between tip 144a and ramp r already has been broken. Consequently, no friction between the governor and the associated follower, with accompanying loss of energy and wear, occurs when motor 13 is in operation. However, with a view to the—concededly very short—periods of travel of the nose tip 144a on the ramp r at the start and when stopping, the material of the nose tip 144a may be conveniently chosen to be softer than that of the ramp r (preferably self-lubricating), and the nose tip as such arranged for ready replacement by a new one.

The described process in reversed sequence takes place of course when motor 13 is stopped.

It will be recognised that, in general, the inclined ramp r also may have a reverse inclination than shown, i.e. that the second arm 53b may be thickest at its first side edge 53b' and thinnest at the inner edge 53b'', ramp q continuing therefrom with this minimal thickness to the second side edge 53b''' (by e.g. making arm 53b hollow under the ramp r and massive under the ramp q, and selecting the said minimal thickness sufficiently large, the above mentioned distribution of the inertial mass relative to axis S, necessary for the desired centrifugal effect, may be easily obtained even in this case). However, irrespective how ramp r is inclined, the chain dotted line II—II in FIG. 1 represents always the path of travel of ramp r or, more precisely, of a selected point thereon, and this path is contained in a plane perpendicular to the rotation axis S.

The result of a reversely inclined ramp r will be an axial control movement in the reverse sense than heretofore described. Such a reverse movement may be desirable e.g. for the control of other ventilator shutter devices than the described one, because it will be readily appreciated that even in the narrower field of ventilator regulation, the present invention is not limited to the exemplary embodiment described.

It will be finally also recognised that the member to be controlled does not necessarily need to be co-axial with the centrifugal governor, because shaft 13a' may define an auxiliary shaft to which the in-value rotation is transferred from elsewhere. In the same way, the out-value rectilinear movement of the follower may be easily transferred elsewhere by appropriate mechanical or electrical means, the essential point being that the follower member is not rotated and thus readily disponible for taking out the control movement imposed thereon.

It will be observed that bar member 53 is practically the only moving part of the centrifugal governor itself and wear is liable to occur only in the pivot mounting thereof.

We claim:

1. A centrifugal governor for generating a rectilinear control movement in dependence on the rotational velocity of a shaft defining an axis of rotation, said governor comprising a centrifugal body, a bearing member rotatable by said shaft and pivotally supporting said centrifugal body on a predetermined fixed axis spaced from the axis of rotation of the bearing member, said axis of said centrifugal body extending parallel to said axis of rotation, said centrifugal body comprising a bar member formed with a ramp sloping relative to said axis of rotation, the path of movement of said bar member intercepting said axis of rotation when said bar member is swung in a plane at right angles to said axis of rotation, first resilient means constantly urging said bar member in a direction towards said axis of rotation, follower means adapted to bear against said ramp at least in the initial position of said bar member and to be displaced by said ramp in dependence on the swinging movement of said bar member, said follower means being constantly urged by second resilient means in the direction towards said bar member and coupled to a device which is to be regulated in dependence on said rotational velocity, and the strengths of said first and second resilient means being selected such that said first resilient means is stronger than said second resilient means but weaker than the combined force of said second resilient means plus the centrifugal force generated upon rotation of said centrifugal body.

2. The governor of claim 1, wherein two end stop means are provided to limit the pivotal movement of the bar member.

3. The governor of claim 1, wherein the bearing member is defined by a bottom plate having an upright peripheral side wall.

4. The governor of claim 3, wherein one of the stop means is defined by said side wall and the first resilient means comprises a hair pin spring, one arm of the spring bearing against said side wall and the other arm affecting the bar member.

5. The governor of claim 1, wherein for the elimination of friction between the bar member and the follower means, when the latter is positioned in the vicinity of the lowermost part of the inclined ramp, a stop means is provided to stop and hold the follower means at a predetermined spaced position away said lowermost portion.

6. The governor of claim 1, wherein in rest position the inclined ramp has its highest portion in the vicinity of the said axis of rotation.

7. The governor of claim 1, wherein the bar member comprises a non-inclined ramp adjacent to the inclined ramp.

8. The governor of claim 1, used for controlling a ventilator provided with a driving motor and adapted to drive a fluid through a passage, wherein the follower means is coupled to means for temporary closing said passage.

9. The governor of claim 8, used in a ventilator the closing means of which comprises a plurality of pivotable shutter blades controllable by a driver means constantly affected by a resilient means, wherein the bearing member is mounted on an outgoing shaft of said driving motor, the follower means is connected to said driver means and said second resilient means is defined by the said resilient means affecting the driver means.

10. The governor of claim 9, wherein the follower means is defined by a terminal portion of the driver means turned towards the driving motor.

* * * * *